United States Patent
Xu et al.

(10) Patent No.: US 9,729,875 B2
(45) Date of Patent: Aug. 8, 2017

(54) PALETTE CODING MODE

(71) Applicant: SONY CORPORATION, Tokyo (JP)

(72) Inventors: Jun Xu, Sunnyvale, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 217 days.

(21) Appl. No.: 14/323,842

(22) Filed: Jul. 3, 2014

(65) Prior Publication Data

US 2015/0010053 A1  Jan. 8, 2015

Related U.S. Application Data

(60) Provisional application No. 61/843,693, filed on Jul. 8, 2013, provisional application No. 61/923,455, filed on Jan. 3, 2014.

(51) Int. Cl.
| | |
|---|---|
| *H04N 19/157* | (2014.01) |
| *H04N 19/182* | (2014.01) |
| *H04N 19/105* | (2014.01) |
| *H04N 19/46* | (2014.01) |
| *H04N 7/12* | (2006.01) |
| *H04N 19/117* | (2014.01) |
| *H04N 19/196* | (2014.01) |
| *H04N 19/176* | (2014.01) |
| *H04N 19/136* | (2014.01) |
| *B41B 15/00* | (2006.01) |

(52) U.S. Cl.
CPC ......... *H04N 19/105* (2014.11); *H04N 19/182* (2014.11); *H04N 19/46* (2014.11)

(58) Field of Classification Search
CPC ....... H04N 19/00212; H04N 19/00024; H04N 19/00303; H04N 19/105; H04N 19/46; H04N 19/182
USPC ...................................... 375/240.02
See application file for complete search history.

(56) References Cited

U.S. PATENT DOCUMENTS

| | | | | |
|---|---|---|---|---|
| 5,953,501 A | * | 9/1999 | Hattori | G06T 9/005 358/1.15 |
| 6,088,394 A | | 7/2000 | Maltby | |
| 2007/0253492 A1 | * | 11/2007 | Shelton | H04N 19/70 375/240.26 |
| 2012/0314766 A1 | | 12/2012 | Chien et al. | |
| 2014/0185665 A1 | * | 7/2014 | Pu | H04N 19/00066 375/240.02 |
| 2014/0301475 A1 | * | 10/2014 | Guo | H04N 19/50 375/240.24 |

OTHER PUBLICATIONS

Sullivan et al. "Overview of the High Efficiency Video Coding (HEVC) Standard," IEEE Transactions on Circuits and Systems for Video Technology, vol. 22, No. 12, Dec. 2012.

* cited by examiner

*Primary Examiner* — Hee-Yong Kim
(74) *Attorney, Agent, or Firm* — O'Banion & Ritchey LLP; John P. O'Banion

(57) ABSTRACT

Enhanced signaling is provided for video coding using a palette coding mode. In one aspect, the sending of a copy from above flag is skipped for the first row of a coding unit (CU), towards eliminating flag redundancy and to address a CU boundary issue. In a second aspect, an address line repeating pattern issue is overcome by signaling a single copy from above flag, except the first row, despite the fact that multiple runs exist in the row.

16 Claims, 6 Drawing Sheets

Run mode

Copy above mode

Across CUs

| | |
|---|---|
| palette_coding ( x0, y0, nPbW, nPbH , cIdx){ | |
|   if (!palette_pred_flag[x0][y0]){ | |
|     palette_size_minus1[x0][y0] | ae(v) |
|     for( i = 0; i <=palette_size_minus1[x0][y0]; i ++ ) | |
|       palette[x0][y0][i] | ae(v) |
|   } | |
|   else{ | |
|     palette_size_minus1[x0][y0] = <br>      x0? (palette_mode_flag[x0-1][y0]? palette_size_minus1[x0-1][y0]: 0 ) : 0 | |
|     for(i = 0; i <= palette_size_minus1 [x0][y0]; i ++ ) | |
|       palette[x0][y0] [i]= x0?palette[x0-1][y0] [i]:0 | |
|   } | |
|   scanPos = 0 | |
|   while (scanPos < nPbW * nPbH ) { | |
|     copy_above_flag | ae(v) |
|     if (copy_above_flag){ | |
|       copy_run | |
|       run = copy_run | |
|     } | |
|     else{ | |
|       palette_flag | |
|       if (palette_flag) { | |
|         if (palette_size > 1) { | |
|           palette_index | |
|         } | ae(v) |

FIG. 6A
(Prior Art)

| | |
|---|---|
|      palette_run | |
|         run = palette_run | |
|    } | |
|   else{ | |
|   sample_value | |
|     xC = scanPos% nPbW | |
|     yC = scanPos/ nPbW | |
|     TransCoeffLevel[ x0 ][ y0 ][ cIdx ][ xC ][ yC ] = sample_value | |
|     scanPos++ | |
|   } | |
| If (copy_above_flag \|\| palette_flag){ | |
|   runPos= 0 | |
|   while (runPos <= run){ | |
|     xC = scanPos% nPbW | |
|     yC = scanPos/ nPbW | |
|     if (palette_flag){ | |
|       TransCoeffLevel[ x0 ][ y0 ][ cIdx ][ xC ][ yC ] = palette[x0][y0] [paletteIdx] | |
|     } | |
|   else{ | |
|   TransCoeffLevel[ x0 ][ y0 ][ cIdx ][ xC ][ yC ] = TransCoeffLevel[ x0 ][ y0 ][ cIdx ][ xC ][ yC-1 ] | |
|   } | |
|     runPos ++ | |
|     scanPos++ | |
|    } | |
|   } | |
|  } | |
| } | |

FIG. 6B
(Prior Art)

| | |
|---|---|
| palette_coding ( x0, y0, nPbW, nPbH , cIdx){ | |
|   if (!palette_pred_flag[x0][y0]){ | |
|     palette_size_minus1[x0][y0] | ae(v) |
|     for( i = 0; i <=palette_size_minus1[x0][y0]; i ++ ) | |
|       palette[x0][y0][i] | ae(v) |
|   } | |
|   else{ | |
|     palette_size_minus1[x0][y0] = <br>      x0? (palette_mode_flag[x0-1][y0]? palette_size_minus1[x0-1][y0]: 0 ) : 0 | |
|     for(i = 0; i <= palette_size_minus1 [x0][y0]; i ++) | |
|       palette[x0][y0] [i]= x0?palette[x0-1][y0] [i]:0 | |
|   } | |
|   scanPos = 0 | |
|   while (scanPos < nPbW * nPbH) { | |
|     if (scanPos >= nPbW ) | |
|       copy_above_flag | ae(v) |
|     Else | |
|       copy_above_flag = false | |
|     if (copy_above_flag){ | |
|       copy_run | |
|       run = copy_run | |
|     } | |
|     else{ | |
|       palette_flag | |
|       if (palette_flag) { | |
|         if (palette_size > 1) { | |
|           palette_index | |
|         } | ae(v) |
|         palette_run | |
|         run = palette_run | |
|       } | |

FIG. 7A

| | |
|---|---|
| else{ | |
| sample_value | |
| xC = scanPos% nPbW | |
| yC = scanPos/ nPbW | |
| TransCoeffLevel[ x0 ][ y0 ][ cIdx ][ xC ][ yC ] = sample_value | |
| scanPos++ | |
| } | |
| If (copy_above_flag \|\| palette_flag){ | |
| runPos= 0 | |
| while (runPos <= run){ | |
| xC = scanPos% nPbW | |
| yC = scanPos/ nPbW | |
| if (palette_flag){ | |
| TransCoeffLevel[ x0 ][ y0 ][ cIdx ][ xC ][ yC ] = palette[x0][y0] [paletteIdx] | |
| } | |
| else{ | |
| TransCoeffLevel[ x0 ][ y0 ][ cIdx ][ xC ][ yC ] = TransCoeffLevel[ x0 ][ y0 ][ cIdx ][ xC ][ yC-1 ] | |
| } | |
| runPos ++ | |
| scanPos++ | |
| } | |
| } | |
| } | |
| } | |

FIG. 7B

PALETTE CODING MODE

CROSS-REFERENCE TO RELATED APPLICATIONS

This application claims priority to, and the benefit of, U.S. provisional patent application Ser. No. 61/923,455 filed on Jan. 3, 2014, incorporated herein by reference in its entirety. This application claims priority to, and the benefit of, U.S. provisional patent application Ser. No. 61/843,693 filed on Jul. 8, 2013, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This invention pertains generally to high efficiency video coding (HEVC) systems, and more particularly to enhancing palette coding modes in HEVC range extension (RExt).

2. Background Discussion

HEVC is a high efficiency video coding standard, which provides significant benefits over previous video coding standards. Enhancements of HEVC have been underway utilizing a series of range extensions (RExt). In recent JCTVC standards activity, palette coding mode is proposed to RExt, as range extensions core experiment (RCE 4).

Accordingly, the technology presented provides enhancements for RCE as RExt in HEVC video coding systems.

BRIEF SUMMARY

Signaling redundancy using palette coding for screen content in RExt is reduced, in particular for range extensions core experiment 4 (RCE 4). The amount of modification in software and text is minor. Comparing to RCE 4 Test 2, simulation results report bit-rate saving up to −0.2% for AI, −0.4% for RA, and −0.9% for LD under lossy settings and up to −0.2% for AI, −0.6% for RA, and −0.4% for LD under lossless settings.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 6A and FIG. 6B is a pseudo code representation of palette coding for HEVC.

FIG. 7A and FIG. 7B is a pseudo code representation of palette coding for HEVC according to an embodiment of the present disclosure.

DETAILED DESCRIPTION

In the recent JCTVC-O0218, HEVC standard "copy from above" mode copies the palette indices from above sample positions. However, at the first row of a coding unit (CU), the above sample is from a different CU which can have different palettes. In view of this, it will be recognized that the "copy from above" mode may not be valid for the first row of CU. Accordingly, signaling of the "copy from above" mode is redundant for the first row of CU in palette mode.

In palette mode based coding, the CU encoding is controlled by a palette mode flag. Palette transmission may comprise copying from the left mode, or direct coding for each color component. CU pixel value coding can have (a) copy above mode, (b) run mode or (c) pixel mode.

Figure 1:
FIG. 1 is a pixel diagram of CU encoding controlled by a palette mode flag shown in "run" mode.

FIG. 1 depicts a run mode (e.g., seen as left most 6 pixels), with a second run to the right of that. In run mode, a palette index is followed by a "run" of pixels.

In pixel mode a direct coding of pixel values is performed.

Figure 2:
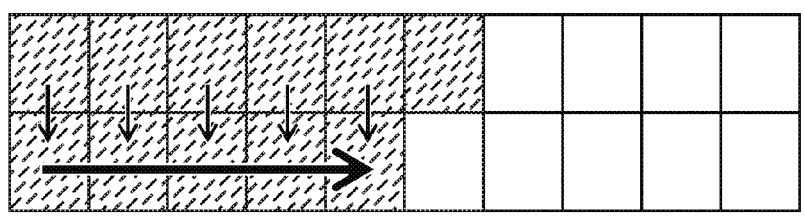
FIG. 2 is a pixel diagram of CU encoding shown in "copy above mode".

FIG. 2 depicts a "copy above mode" with a "run" of pixels to indicate how many pixels to copy.

However, a CU boundary issue can arise in using "copy from above" across the CU boundary, because different CUs may have different palettes.

Figure 3:
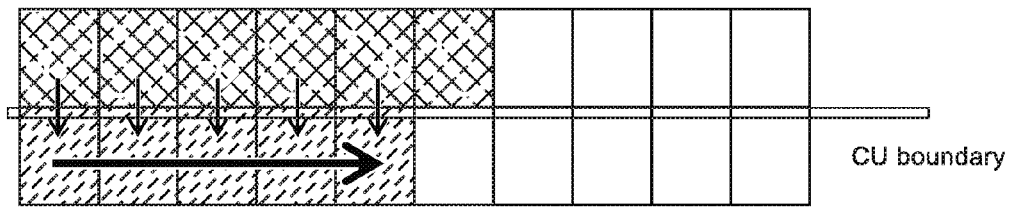
FIG. 3 is a pixel diagram of CU encoding modifying "copy from above" mode according to a first embodiment of the disclosed technology.

FIG. 3 depicts that a first row of CU does not utilize copy from above mode and the "copy_above_flag" is set to false. Yet, a redundancy exists of signaling the copy_above_flag at the first row of a CU.

In addition, there can be an issue with line repeating pattern. For screen content, there might be more line repeating patterns when CU size is small, such as 8×8 pixels. Line repeating pattern means that the palette indices are the same as the above line. But the existing palette coding mechanisms in RExt would require more bits to signal such a pattern.

A first element of the present technology addresses the CU boundary issue. There is redundancy of signaling copy_above_flag at first row of CU. To remove redundancy in signaling of "copy from above" mode, the present disclosure skips the signaling (sending) of "run" or "copy from above" modes for the first row and sets all samples at the first row as "run" mode. Only one condition is added as the solution. When copy_above_flag is not present, the copy_above_flag will be considered to be false.

In a second element of the disclosure, the address line repeating pattern is addressed.

Figure 4:
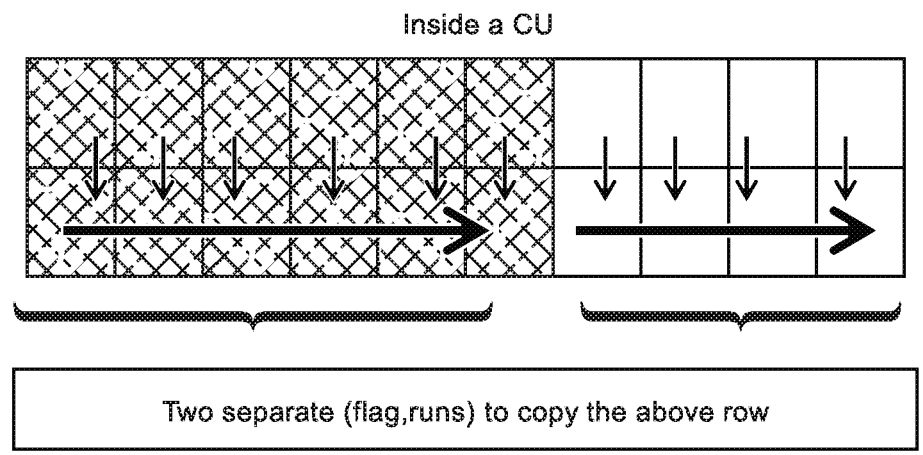
FIG. 4 is a pixel diagram of CU encoding using two separate (flag, runs) to copy an above.

FIG. 4 depicts inside a CU in which two separate flags are used for two separate runs.

Figure 5:
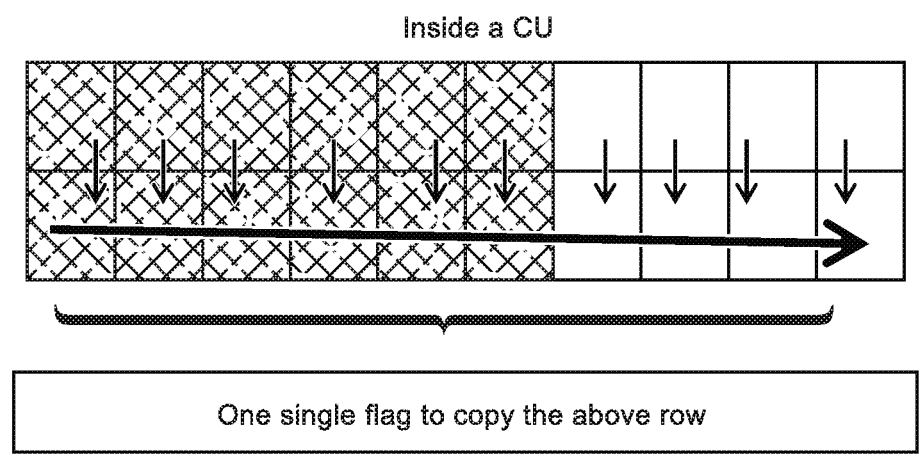
FIG. 5 is a pixel diagram of CU encoding modifying "copy from above" utilizing a single flag to copy the above row, despite the existence of multiple runs, according to a second embodiment of the disclosed technology.

FIG. 5 depicts an aspect of the this second implementation, in which a single flag is utilized to copy the row above for both runs. Thus, at the beginning of each row, except the first row, one flag is utilized to indicate whether the whole row will copy from above row.

The proposed solutions are preferably implemented, such as based on RExt5.1. Simulations are conducted following the test conditions used for RCE 4. Encoding and decoding time is not available because simulations are run in a heterogeneous cluster.

The enhancements described in the presented technology can be readily implemented within various image and video encoders and decoders. It should also be appreciated that encoders and decoders are preferably implemented to include one or more computer processor devices (e.g., CPU, microprocessor, microcontroller, computer enabled ASIC, etc.) and associated memory (e.g., RAM, DRAM, NVRAM, FLASH, computer readable media, etc.) whereby programming stored in the memory and executable on the processor perform the steps of the various process methods described herein. The computer and memory devices were not depicted in the diagrams for the sake of simplicity of illustration, as one of ordinary skill in the art recognizes the use of computer devices for carrying out steps involved with image/video encoding and decoding. The presented technology is non-limiting with regard to memory and computer-readable media, insofar as these are non-transitory, and thus not constituting a transitory electronic signal.

FIG. 6A and FIG. 6B depict a coding example for conventional HEVC palette coding.

FIG. 7A and FIG. 7B illustrate an example embodiment of HEVC palette coding according to an embodiment of the present disclosure. The four rows of the table which are bolded depict coding changes for preventing the sending of the copy_above_flag for the first row and which thus prevents a copy run for this row, because the copy_above_flag is set to false.

Summaries of results for both lossy and lossless settings are listed in Tables 1A-1C, 2A-2B, 3A-3B, and 4. The anchor is the results of RCE4 Test 2. Tables 1A-1C depict lossy settings for all intra tested at main-tier (Table 1A), high-tier (Table 1B), and super-high-tier (Table 1C). Tables 2A-2B depict lossy settings for random access in main-tier (Table 2A) and in high-tier (Table 2B). Tables 3A-3B depict lossy settings for low delay in B main-tier (Table 3A) and in low delay B high-tier (Table 3B). Table 4 lists a summary of average bit rate increase results for AI, RA, and LB.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for enhanced video encoding using a palette coding mode, comprising: (a) a computer processor; and (b) programming in a non-transitory computer readable medium and executable on the computer processor for performing steps comprising: (b)(i) performing coding of a coding unit (CU) based on a palette mode including a pixel mode, a run mode and a copy from above mode; and (b)(ii)

skipping sending of a flag for the copy from above mode for the first row of a coding unit, wherein failure to receive the flag for the copy from above mode is considered to indicate that copy from above mode is false; and (b)(iii) using a single flag, except in the first row, to indicate whether the whole row will copy from a row above.

2. The apparatus of any preceding embodiment, wherein said apparatus overcomes a coding unit (CU) boundary issue in situations where different CUs have different palettes, while eliminating redundancy in signaling the flag for copy from above mode for a first row of a CU, and elimination of one copy from above flag instances of multiple runs overcomes an issue with address line repeating patterns.

3. An apparatus for enhanced video encoding using a palette coding mode, comprising: (a) a computer processor; and (b) programming in a non-transitory computer readable medium and executable on the computer processor for performing steps comprising: (b)(i) performing coding of a coding unit (CU) based on a palette mode including a pixel mode, a run mode and a copy from above mode; and (b)(ii) skipping sending of a flag for the copy from above mode for a first row of a coding unit, wherein failure to receive the flag for the copy from above mode is considered to indicate that copy from above mode is false.

4. The apparatus of any preceding embodiment, wherein said apparatus overcomes a coding unit (CU) boundary issue in situations where different CUs have different palettes.

5. The apparatus of any preceding embodiment, wherein said apparatus eliminates redundancy in signaling the flag for copy above mode for the first row of a CU.

6. The apparatus of any preceding embodiment, wherein said pixel mode performs direct coding of a pixel value.

7. The apparatus of any preceding embodiment, wherein said run mode has a palette index followed by a pixel run.

8. The apparatus of any preceding embodiment, wherein said copy from above mode has a run indicating how many pixels to copy.

9. The apparatus of any preceding embodiment, further comprising programming executable on the computer processor is configured for performing steps including using a single flag, except in the first row, to indicate whether the whole row will copy from a row above.

10. The apparatus of any preceding embodiment, wherein said elimination of one flag overcomes an issue with address line repeating patterns.

11. The apparatus of any preceding embodiment, wherein said apparatus is configured for implementation in a range extension (RExt) during high efficiency video coding (HEVC).

12. An apparatus for enhanced video encoding using a palette coding mode, comprising: (a) a computer processor; and (b) programming in a non-transitory computer readable medium and executable on the computer processor for performing steps comprising: (b)(i) performing coding of a coding unit (CU) based on a palette mode including a pixel mode, a run mode and a copy from above mode; and (b)(ii) using a single flag, except in a first row of the CU, to indicate whether this whole row will copy from a row above.

13. The apparatus of any preceding embodiment, wherein said elimination of one flag overcomes an issue with address line repeating patterns.

14. The apparatus of any preceding embodiment, wherein said pixel mode performs direct coding of a pixel value.

15. The apparatus of any preceding embodiment, wherein said run mode has a palette index followed by a pixel run.

16. The apparatus of any preceding embodiment, wherein said copy from above mode has a run indicating how many pixels to copy.

17. The apparatus of any preceding embodiment, further comprising programming executable on the computer processor is configured for performing steps including skipping sending of a flag for the copy from above mode for a first row of a coding unit, wherein failure to receive the flag for the copy from above mode is considered to indicate that copy from above mode is false.

18. The apparatus of any preceding embodiment, wherein said apparatus overcomes a coding unit (CU) boundary issue in situations where different CUs have different palettes.

19. The apparatus of any preceding embodiment, wherein said apparatus eliminates redundancy in signaling the flag for copy above mode for the first row of a CU.

20. The apparatus of any preceding embodiment, wherein said apparatus is configured for implementation in a range extension (RExt) during high efficiency video coding (HEVC).

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1A

Results for Lossy Settings with All Intra Main-Tier

| | All Intra Main-tier | | |
|---|---|---|---|
| | Y | U | V |
| Class F | 0.0% | 0.0% | 0.0% |
| Class B | 0.0% | 0.0% | 0.0% |
| RGB 4:4:4 SC | 0.0% | 0.0% | 0.0% |
| RGB 4:4:4 Animation | 0.0% | 0.0% | 0.0% |
| YCbCr 4:4:4 SC | −0.1% | 0.0% | 0.0% |
| YCbCr 4:4:4 Animation | 0.0% | 0.0% | 0.0% |
| RangeExt | 0.0% | 0.0% | 0.0% |
| RGB 4:4:4 SC (Optional) | −0.1% | −0.2% | −0.2% |
| YCbCr 4:4:4 SC (Optional) | −0.2% | −0.2% | −0.2% |

TABLE 1B

Results for Lossy Settings with All Intra High-Tier

| | All Intra High-tier | | |
|---|---|---|---|
| | Y | U | V |
| Class F | 0.0% | 0.0% | 0.0% |
| Class B | 0.0% | 0.0% | 0.0% |
| RGB 4:4:4 SC | 0.0% | −0.1% | 0.0% |
| RGB 4:4:4 Animation | 0.0% | 0.0% | 0.0% |
| YCbCr 4:4:4 SC | −0.1% | 0.0% | 0.0% |
| YCbCr 4:4:4 Animation | 0.0% | 0.0% | 0.0% |
| RangeExt | 0.0% | 0.0% | 0.0% |
| RGB 4:4:4 SC (Optional) | −0.2% | −0.2% | −0.2% |
| YCbCr 4:4:4 SC (Optional) | −0.2% | −0.2% | −0.2% |

TABLE 1C

Results for Lossy Settings with All Intra Super-High-Tier

| | All Intra Super-High-tier | | |
|---|---|---|---|
| | Y | U | V |
| Class F | 0.0% | 0.0% | 0.0% |
| Class B | 0.0% | 0.0% | 0.0% |
| RGB 4:4:4 SC | −0.1% | −0.1% | −0.1% |
| RGB 4:4:4 Animation | 0.0% | 0.0% | 0.0% |
| YCbCr 4:4:4 SC | −0.1% | −0.1% | −0.1% |
| YCbCr 4:4:4 Animation | 0.0% | 0.0% | 0.0% |
| RangeExt | 0.0% | 0.0% | 0.0% |
| RGB 4:4:4 SC (Optional) | −0.2% | −0.2% | −0.2% |
| YCbCr 4:4:4 SC (Optional) | −0.2% | −0.2% | −0.2% |

TABLE 2A

Results for Lossy Settings with Random Access Main-Tier

| | Random Access Main-tier | | |
|---|---|---|---|
| | Y | U | V |
| Class F | 0.0% | 0.0% | −0.1% |
| Class B | 0.0% | 0.0% | 0.0% |
| RGB 4:4:4 SC | 0.0% | −0.1% | 0.0% |
| RGB 4:4:4 Animation | 0.0% | 0.0% | 0.0% |
| YCbCr 4:4:4 SC | −0.1% | −0.2% | −0.1% |
| YCbCr 4:4:4 Animation | 0.0% | 0.0% | 0.0% |
| RangeExt | 0.0% | 0.0% | 0.0% |
| RGB 4:4:4 SC (Optional) | −0.2% | −0.2% | −0.2% |
| YCbCr 4:4:4 SC (Optional) | −0.4% | −0.5% | −0.4% |

TABLE 2B

Results for Lossy Settings with Random Access High-Tier

| | Random Access High-tier | | |
|---|---|---|---|
| | Y | U | V |
| Class F | 0.0% | 0.0% | 0.0% |
| Class B | 0.0% | 0.0% | 0.0% |
| RGB 4:4:4 SC | −0.1% | −0.1% | −0.1% |
| RGB 4:4:4 Animation | 0.0% | 0.0% | 0.0% |
| YCbCr 4:4:4 SC | −0.4% | −0.3% | −0.3% |
| YCbCr 4:4:4 Animation | 0.0% | 0.0% | 0.0% |
| RangeExt | 0.0% | 0.0% | 0.0% |
| RGB 4:4:4 SC (Optional) | −0.2% | −0.2% | −0.2% |
| YCbCr 4:4:4 SC (Optional) | −0.4% | −0.5% | −0.5% |

TABLE 3A

Results for Lossy Settings with Low Delay B Main-Tier

| | Low Delay B Main-tier | | |
|---|---|---|---|
| | Y | U | V |
| Class F | 0.1% | −0.1% | 0.0% |
| Class B | 0.0% | 0.0% | 0.0% |
| RGB 4:4:4 SC | −0.1% | −0.1% | −0.2% |
| RGB 4:4:4 Animation | 0.0% | 0.0% | 0.0% |
| YCbCr 4:4:4 SC | −0.1% | −0.1% | −0.2% |
| YCbCr 4:4:4 Animation | 0.0% | 0.0% | 0.0% |
| RangeExt | 0.0% | 0.0% | 0.0% |
| RGB 4:4:4 SC (Optional) | −0.1% | −0.1% | −0.1% |
| YCbCr 4:4:4 SC (Optional) | −0.9% | −0.9% | −0.8% |

TABLE 3B

Results for Lossy Settings with Low Delay B High-Tier

| | Low Delay B High-tier | | |
|---|---|---|---|
| | Y | U | V |
| Class F | 0.2% | 0.0% | 0.0% |
| Class B | 0.0% | 0.0% | 0.0% |
| RGB 4:4:4 SC | −0.1% | −0.2% | −0.2% |
| RGB 4:4:4 Animation | 0.0% | 0.0% | 0.0% |
| YCbCr 4:4:4 SC | −0.1% | −0.1% | −0.1% |
| YCbCr 4:4:4 Animation | 0.0% | 0.0% | 0.0% |
| RangeExt | 0.0% | 0.0% | 0.0% |
| RGB 4:4:4 SC (Optional) | −0.1% | −0.1% | −0.1% |
| YCbCr 4:4:4 SC (Optional) | −0.6% | −0.6% | −0.5% |

TABLE 4

Average Bit Rate Increase Results for Lossless Settings

| | Average Bit Rate Increase | | |
|---|---|---|---|
| | AI | RA | LB |
| Class F | 0.0% | 0.0% | 0.0% |
| Class B | 0.0% | 0.0% | 0.0% |
| RGB 4:4:4 SC | 0.0% | 0.0% | −0.1% |
| RGB 4:4:4 Animation | 0.0% | 0.0% | 0.0% |
| YCbCr 4:4:4 SC | 0.0% | 0.0% | −0.1% |
| YCbCr 4:4:4 Animation | 0.0% | 0.0% | 0.0% |
| RangeExt | 0.0% | 0.0% | 0.0% |
| RGB 4:4:4 SC (Optional) | −0.2% | −0.2% | −0.4% |
| YCbCr 4:4:4 SC (Optional) | −0.2% | −0.6% | −0.3% |

What is claimed is:

1. An apparatus for enhanced video encoding using a palette coding mode, comprising:
   (a) a computer processor; and
   (b) programming in a non-transitory computer readable medium and executable on the computer processor for performing steps comprising:
      (i) performing coding of a coding unit (CU) based on a palette mode including a pixel mode, a run mode and a copy from above mode;
      (ii) wherein said run mode signals a palette index and a palette run indicating a number of subsequent pixels to encode with the same palette index;
      (iii) skipping sending of a flag for the run mode and the copy from above mode for the first row of a coding unit, and preventing sending a copy run, wherein failure to receive the flag for the copy from above mode is considered to indicate that copy from above mode is false and that all samples at the first row are processed as the run mode, having a palette index and palette run; and (iv) using one single flag, except in the first row of a coding unit, to indicate that a whole row is to be copied from a row above.

2. The apparatus recited in claim 1, wherein said apparatus overcomes a boundary issue at a coding unit (CU) boundary in situations where different CUs have different palettes, toward preventing copying from above while reducing signaling redundancy by eliminating copy from above and run mode flag bits.

3. The apparatus recited in claim 1, wherein said apparatus eliminates redundancy in signaling the flag for copy above mode for the first row of a CU.

4. The apparatus recited in claim 1, wherein said pixel mode performs direct coding of a pixel value.

5. The apparatus recited in claim 1, wherein said run mode has a palette index followed by a pixel run.

6. The apparatus recited in claim 1, wherein said copy from above mode has a run indicating how many pixels to copy.

7. The apparatus recited in claim 1, wherein said elimination of one flag overcomes an issue with address line repeating patterns in palette coding mechanisms in RExt which require more bits for signaling the pattern.

8. The apparatus recited in claim 1, wherein said apparatus is configured for implementation in a range extension (RExt) during high efficiency video coding (HEVC).

9. A method for performing enhanced video encoding using a palette coding mode, comprising steps:

(a) performing coding of a coding unit (CU) in a video encoding device, wherein said coding is based on a palette mode including a pixel mode, a run mode and a copy from above mode;

(b) wherein said run mode signals a palette index and a palette run indicating a number of subsequent pixels to encode with the same palette index;

(c) skipping sending of a flag for the run mode and the copy from above mode for the first row of a coding unit, and preventing sending a copy run, wherein failure to receive the flag for the copy from above mode is considered to indicate that copy from above mode is false and that all samples at the first row are processed as the run mode, having a palette index and palette run; and (d) using one single flag, except in the first row of a coding unit, to indicate that a whole row is to be copied from a row above.

10. The method recited in claim 9, wherein said method overcomes a boundary issue at a coding unit (CU) boundary in situations where different CUs have different palettes, toward preventing copying from above while reducing signaling redundancy by eliminating copy from above and run mode flag bits.

11. The method recited in claim 9, wherein said method eliminates redundancy in signaling the flag for copy above mode for the first row of a CU.

12. The method recited in claim 9, wherein said pixel mode performs direct coding of a pixel value.

13. The method recited in claim 9, wherein said run mode has a palette index followed by a pixel run.

14. The method recited in claim 9, wherein said copy from above mode has a run indicating how many pixels to copy.

15. The method recited in claim 9, wherein said elimination of one flag overcomes an issue with address line repeating patterns in palette coding mechanisms in RExt which require more bits for signaling the pattern.

16. The method recited in claim 9, wherein said apparatus is configured for implementation in a range extension (RExt) during high efficiency video coding (HEVC).

* * * * *